N. Y. GORDON AND J. HODGES.
AUTOMOBILE SIGNAL.
APPLICATION FILED FEB. 4, 1920.
1,349,063.
Patented Aug. 10, 1920.
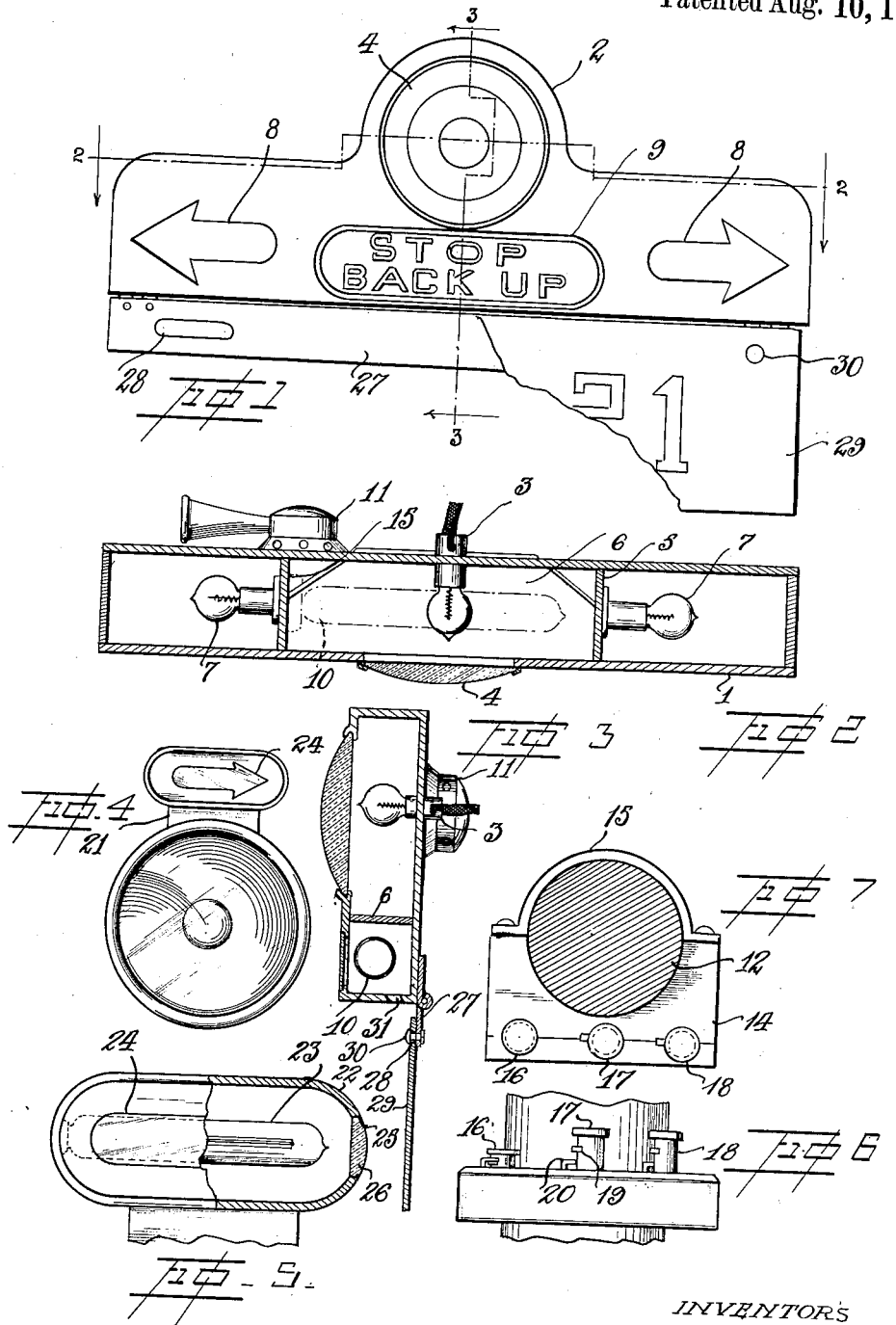
INVENTORS
NORMAN Y. GORDON.
and John Hodges
E. H. Bond
Atty.

UNITED STATES PATENT OFFICE.

NORMAN Y. GORDON, OF ROCHESTER, NEW YORK, AND JOHN HODGES, OF DETROIT, MICHIGAN.

AUTOMOBILE-SIGNAL.

1,349,063.   Specification of Letters Patent.   Patented Aug. 10, 1920.

Application filed February 4, 1920. Serial No. 356,256.

*To all whom it may concern:*

Be it known that we, NORMAN Y. GORDON and JOHN HODGES, citizens of the United States, residing, respectively, at Rochester, in the county of Monroe and State of New York, and at Detroit, in the county of Wayne and State of Michigan, have invented certain new and useful Improvements in Automobile-Signals, of which the following is a specification.

This invention relates to automobile signals and has for its particular object to give a simultaneous signal at the front and rear of the car showing in which direction the car is going to turn.

A further object is to provide an indicating means whereby the car operator can signal that he is about to back up his car and any other cars in the rear of his car will be so advised by looking at the signal on the rear of his car.

A further object is to provide an audible signal which operates in conjunction with the stop and back up signal.

A further object is to provide an automobile signaling device where each signal is operated by a separate button.

With these and other objects in view, the invention consists in the construction, combination and arrangement of parts as will be hereinafter fully described, illustrated in the accompanying drawings, and pointed out in the claim hereunto appended.

Figure 1 is a front view of the rear signaling device,

Fig. 2 is a section view on the line 2—2 of Fig. 1,

Fig. 3 is a section view on the line 3—3 of Fig. 1,

Fig. 4 is a front plan view of one of the front signaling devices,

Fig. 5 is an enlarged view of the same, part being broken away,

Fig. 6 is an elevation view of the operating buttons, one of which is shown in operation position, and Fig. 7 is a top plan view.

Referring to the drawings like numerals designate like parts in the various drawings.

The numeral 1 illustrates a rectangular casing having an upwardly extending central portion 2 in which the usual tail light 3 is positioned having the usual red glass 4 covering the opening in front of the light. The rectangular casing 1 is divided by the upright partitions 5 and the cross partition 6 which makes the casing into four distinct compartments.

As hereinbefore mentioned the compartment above the cross partition 6 and between the upright partitions 5 is where the usual tail light is positioned and is connected and operative in the usual manner. The compartments formed between the upright partitions 5 and the ends of the rectangular casing 1 are provided with suitable lights 7 and the front of the casing is provided with an opening cut in the form of an outwardly directing arrow as at 8.

The compartment below the cross partition 6 and the uprights 5 has an oval opening 9 in which a suitable glass is positioned with the words Stop—back up thereon. This compartment is provided with a suitable light 10 adapted to light the compartment so as to show the signal Stop—back up when desired.

11 is an electric horn connected with the rear of the casing 1.

Referring to Figs. 6 and 7, 12 indicates the steering rod casing onto which is attached a suitable block 14 having a suitable means 15 for holding the block to the steering rod casing. This block 14 is provided with three buttons 16, 17, and 18, which buttons are provided with a pin 19 extending outwardly from one side. 20 indicates angular holder members having one end secured in the block 14 and the other end extending toward its respective pin so that when the button is pressed down and turned the pin 19 will engage under the angular holder members 20 and stay in this position until turned back. Suitable springs can be positioned under the respective buttons so as to have an outward tension from the under side thereof.

On the front lights of the car we provide a bracket 21 which supports a casing 22 in which is positioned a light 23. The front side of the casing is provided with an arrow-shaped opening 24. The outer end of the casing 22 is provided with an opening 25 in which is a colored glass 26.

We have not illustrated in our invention the wiring between the respective buttons, the lights and horn, as electric wiring of this nature is in common use in all automobile construction. The button 16 controls the light 7 on the left hand side of the drawing as shown in Fig. 1. It also controls simultaneously the light 23 on the left hand side at the front of the car, while the button 18 controls the corresponding lights on the right hand side at the front and back. The button 17 controls the light 10 and the electric horn 11 simultaneously so that when the button 17 is pressed downwardly the signal at the back of the car designates that the car is going to back up while simultaneously the horn 11 makes the usual sound and thus would cause required attraction to this signal.

Underneath the casing 1 we provide a number plate strip 27 extending downwardly and provided with the slots 28 to which a number plate 29 may be attached by suitable bolts 30. The bottom of the rectangular casing is provided with an open slot 31 along its lower outside edge through which light rays will shine on the number plate.

From the foregoing it is thought that the construction of our invention will be clearly understood, and, therefore, a more extended explanation has been omitted.

What we claim as new, is,—

A signal for the purpose described, comprising a casing with a cross partition, a tail light in the upper compartment thus formed, a light in the lower compartment, the floor of the lower compartment having an inclined opening to throw the light rays onto the number plate below said casing, upright partitions in said casing, lights in the end compartments thus formed, arrow-shaped openings at the front of the casing, transparent material over said openings, and means for controlling said lights to illuminate the license plate.

In testimony whereof we affix our signatures in the presence of two witnesses.

NORMAN Y. GORDON.
JOHN HODGES.

Witnesses:
 HARMON D. MACDONALD,
 GEORGE GORDON.